United States Patent [19]

Irvoas

[11] 4,425,897

[45] Jan. 17, 1984

[54] DEVICE FOR THE FEEDING OF AN INTERNAL COMBUSTION MOTOR WITH GAS

[76] Inventor: Yves Irvoas, Pont Ar Bloc'h Pleyer Christ, 29223 Saint Thegonnec, France

[21] Appl. No.: 259,337

[22] Filed: Apr. 30, 1981

[30] Foreign Application Priority Data

Apr. 30, 1980 [FR] France ............................. 80 09747
Sep. 12, 1980 [FR] France ............................. 80 19786
Mar. 4, 1981 [FR] France ............................. 81 04681

[51] Int. Cl.$^3$ ............................................ F02M 13/08
[52] U.S. Cl. ............................. 123/527; 123/27 GE; 48/180 C
[58] Field of Search ..................... 48/180 C, 180 R; 123/525, 527, 27 GE

[56] References Cited

U.S. PATENT DOCUMENTS

| | | | |
|---|---|---|---|
| 2,248,222 | 7/1941 | Ensign | 123/527 |
| 3,960,126 | 6/1976 | Shinoda | 123/527 |
| 3,982,516 | 9/1976 | Abernathy | 123/27 GE |
| 4,290,402 | 9/1981 | Bergmann | 123/527 |

Primary Examiner—Charles J. Myhre
Assistant Examiner—E. Rollins Cross
Attorney, Agent, or Firm—William A. Drucker

[57] ABSTRACT

For the feeding of gas to a vehicle motor, a reservoir of liquefied petroleum gas (100) is used in stages of pressure reduction (I to V). The final stage (V) in the intake conduit (T). The outlet stages (IV) and (V) comprising a plurality of pressure reducers ($A_1 \ldots A_i$, respectively $B_1 \ldots B_i$) with non-loaded diaphragm and operating at quasi nil excess pressure and, at starting up and slowing down, in transitory alternating working conditions with oscillatory motion of the diaphragms.

Preferably, the pressure reducers of the outlet stages (IV and V) are arranged in space in accordance with the faces of a regular polyhedron.

12 Claims, 5 Drawing Figures

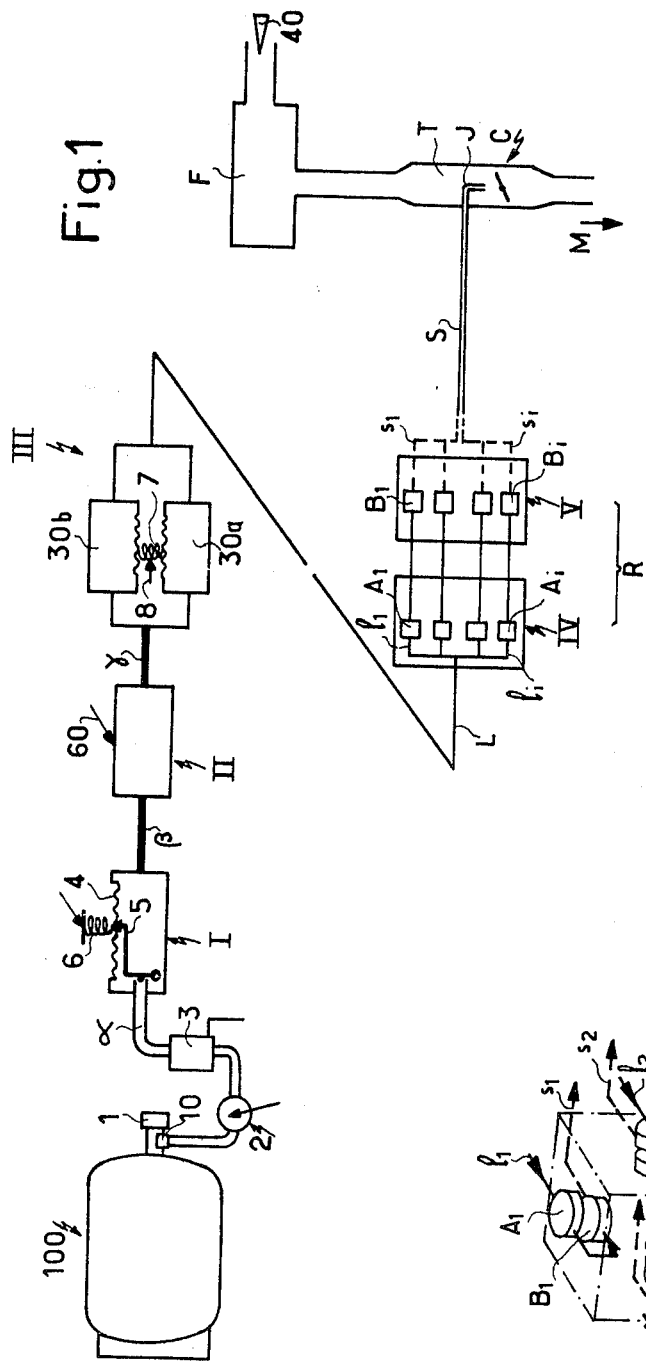
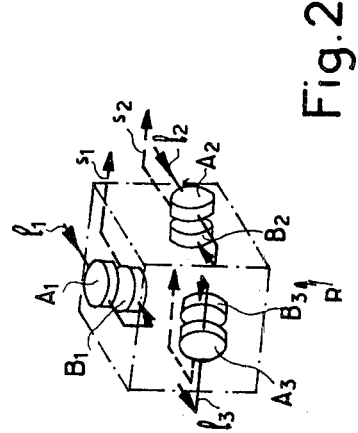
Fig.1
Fig.2

DEVICE FOR THE FEEDING OF AN INTERNAL COMBUSTION MOTOR WITH GAS

The present invention relates to apparatus for the feeding with gas of internal combustion engines and, more particularly, the feeding of motors of vehicles with liquefied petroleum gas.

Most of the existing apparatuses are constituted by a vaporiser-pressure reducer assembly with two or three stages assuring progressive reduction of pressure of the compressed feed gas and its distribution to a carburettor or an injector, simple or mixed for use conjointly with petrol. These successive reductions of pressure have for their object to provide, for the mixing carburettor, combustible gas at constant pressure as near as possible to atmospheric pressure, in order to provide a uniform mixture with the combustion air admitted into the motor. The determination of the ratios of the mass throughputs of combustible gas - combustion air, that is to say the richness of the explosive mixture, presents difficulties because of the different speeds required of the motor, above all so far as relates to the conditions of starting up and slowing down of the motor, and increases of speed.

The present invention has for its object to propose a system of feeding with gas of a thermal motor of great simplicity permitting precise adjustments in reliable manner of the different stages of pressure reducers to correspond to different conditions of use, but however permitting, in operation, large ranges of variation about the initial conditions of adjustment and guaranteeing a sure and rapid starting of the motor, even by hand.

The present invention has for another object to propose such a feed apparatus which is remarkably insensitive to conditions relating to use of the motor, notably the conditions of acceleration or of braking of a vehicle equipped with this motor.

According to the invention, an apparatus for feeding with gas of an internal combustion motor, comprising several stages of pressure reduction interposed in series between a reservoir of gas and the motor, these stages comprising at least one stage of inlet coupled to the reservoir and comprising a pressure reducer loaded by spring means and providing a substantially constant pressure slightly greater than atmospheric pressure and a final stage of great sensitivity having its outlet coupled to the air intake system of the motor, is characterised in that the said final stage comprises at least one pressure reducer with non-loaded diaphragm and is arranged to result in substantially no pressure reduction and to operate on quasi nil excess presssure, when starting up and slowing down, in a transitory alternating style with flexing of the diaphragm as a result of the lowering of pressure in the said intake circuit, the fluctuations of which are thus smoothed out.

According to another feature of the invention, the apparatus comprises two outlet stages each comprising at least one pressure reducer with non-loaded diaphragm and arranged to operate with quasi nil excess pressure.

According to another feature of the invention, the outlet stages comprise at least two pressure reducers disposed in such a manner as to reduce, from the point of view of inertia, the joint effect of weight and centrifugal force.

Other features and advantages of the present invention will appear from the following description of methods of construction given by way of illustration made in relation to the attached drawings wherein:

FIG. 1 is a schematic representation of a gas feed apparatus in accordance with the invention;

FIG. 2 shows schematically a method of construction of the pre-stage/final stage pair of the apparatus of FIG. 1.

Figure 4:
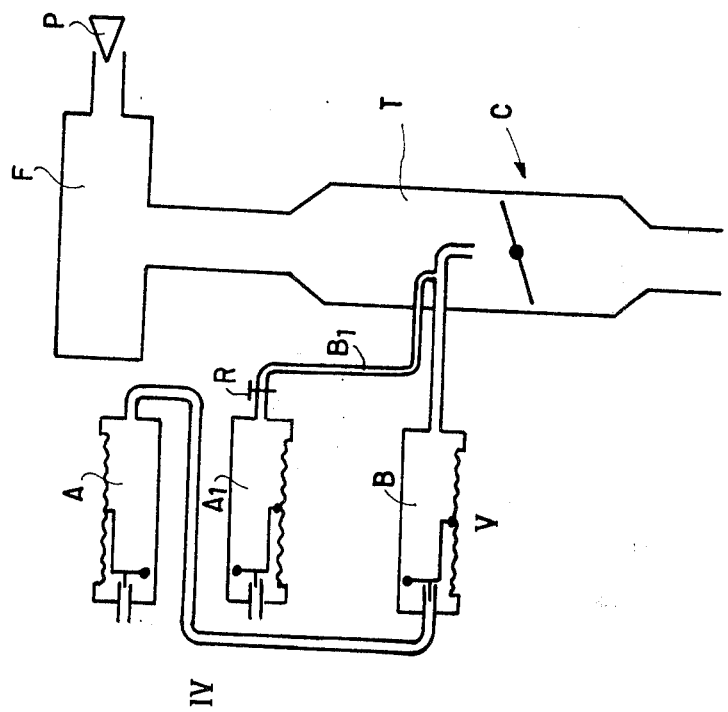
FIG. 4 shows a second modification.

There is shown, in FIG. 1, a feed device for a road vehicle comprising, from upstream towards downstream, a tank 100 of liquefied petroleum gas, such as propane, butane or a mixture of these two gases, provided with a safety valve 1 and a rapid feed coupling to the upstream end of the feed line. This latter comprises an electrovalve 2 for control of opening and closing, a small heating sleeve 3, coupled to the electric system of the motor or to its cooling system, and opens into a first stage I constituted by a pressure reducer of conventional type with control of the upstream by the downstream to provide a constant reduced pressure and comprising a diaphragm 4 acted on in an adjustable manner by a spring 6 and actuating a bent lever 5 provided with a valve, not shown, controlling the opening of the inlet nozzle of the pressure reducer. The outlet $\beta$ of stage I is coupled to a first intermediate pressure reducer II of construction analogous to that of stage I and adapted to be adjusted by a calibrated spring shown at 60. The outlet $\gamma$ of stage II enables the latter to communicate with a second intermediate stage III constituted by two pressure reducers 30a and 30b mounted in parallel and in opposition, with their diaphragms coupled by a spring 7 the loading of which can be adjusted as shown symbolically at 8. The outlets of the pressure reducers 30a and 30b are rejoined in a line L terminating in the vicinity of the motor M in a paired assembly composed of a final pre-stage IV and a final stage V the outlet S of which opens at J in the air intake T of the motor, just before the butterfly valve of the carburettor C, downstream of the air filter F, the inlet of which can be modified to adjust the mass through-put of air by a needle 40.

The first stage I is given very large dimensions, not only so far as concerns the cross-section of its inlet conduit $\alpha$ but also the surface of the diaphragm 4 and/or the lever arm of the lever 5, in order to provide free pressure reduction and vapourisation of the gas coming from the tank 100, and to result in the outlet conduit $\beta$ in a very small excess pressure (a pressure less than 1.2 bar). Stage III completes this pressure reduction, in such a manner that the final stages IV and V only in fact bring about a regulation of the pressure delivered to the conduit T, practically without causing any complementary pressure reduction. These final stages thus function with quasi-nil excess pressure, are extremely sensitive to variations of the pressure drop of the conduit T which pressure drop is thus permitted to "go upstream" the gas feed line, more or less distantly in the upstream direction as a function of the extent of this lowering of pressure (which increases with speed of the motor) because, at least starting from stage III, the excess pressure of the fed gas is infinitesimal.

Upon starting up or upon slowing down, the lowering of pressure in the conduit T is very low, as is known, and is subjected to fluctuation phenomena induced by the strokes of the motor. The final stages IV and V then function in an alternating transitory manner, with flexing in synchronism of the diaphragms as a function of the variations of the said pressure reduction. During the negative alternations of these flexings, the nozzles of the pressure reducers are then found to be much more open than they would be for the median value of the pressure, whilst during the positive alternations they are closed. The resulting effect is a considerable increase of the throughput of gas admitted into the carburettor, which facilitates starting up and improves slowing down. The final stage V preferably comprises several, and in this case at least four, identical pressure reducers $B_1 \ldots B_i$, and the cross-section S of the outlet line is preferably greater than the sum of the sections of the individual outlet nozzles $s_1 \ldots s_i$ of the various pressure reducers $B_i$. It is thus possible to use small pressure reducers the diaphragm of which (of some centimeters in diameter) better follows the flexings than would that of a larger pressure reducer.

The arrangement described obtains, on the one hand, the limitation, in the upstream-downstream direction, of the surges of the pressure of the feed gas as a function of the sequences of opening and closing of the pressure reducer of stage I and, to a lesser extent, of the parallel pressure reducers of stage III, and on the other hand, in the direction downstream-upstream, a certain delaying of the upstream displacement of the pressure drop coming from the conduit T.

The diaphragms of the pressure reducers $B_1 \ldots B_i$ being free, they are particularly subject, from the point of view of inertia, to the environmental conditions, notably of acceleration, turning or braking, of the vehicle equipped with the motor M. The multiplication of the pressure reducers of the final stage already permits, to a certain extent, to be freed from these problems; however, it is furthermore preferable that the pressure reducers $B_i$ shall be orientated in space in such a manner as to reduce inertial effects, one of the arrangements used being to place them according to the faces of a regular polyhedron. In the example shown, with four pressure reducers $B_i$, these will be disposed opposite to each other on the four lateral faces of a cube. In the example shown in FIG. 2, wherein the pressure reducers of each stage IV and V are six in number, the pressure reducers $B_i$ and also the pressure reducers $A_i$ of the final pre-stage are distributed on the six faces of the cube, which gives these stages a mean neutral characteristic relative to external forces.

Independently of the problems of starting up itself, or of slow running of the motor, the applicant has found that the problems of running up the motor, for example for passage from slow running to a nominal operating speed, can be largely resolved by doubling the final stage V with an upstream final pre-stage IV preferably comprising the same number of pressure reducers $A_1 \ldots A_i$ with non-loaded diaphragms. Upon running up, at raised speed, the pressure reduction is sufficient for the pressure reducers of stage V to be completely open and it is on stage IV that the stroking effects result in increase of the call for gas which has been explained above.

The pressure reducers of stage IV will advantageously be distributed in accordance with the same spatial configuration as those of the final stage V. The final pre-stage IV simultaneously introduces a complement of equilibration of the pressure reducers of the final stage and a supplementary delay between the downstream part of the apparatus and the upstream part of the wave fronts of the pressure of the feed gas or of lowering of pressure coming from the conduit T. In regard to this latter phenomenon, the final pre-stage IV provides a certain damping of the wave fronts, particularly of stroking, and thus permits, in a first period, aiding of the running up of the motor by reason of the phenomenon described above, and then in a second period, when the phenomena of stroking take place with a state of flow which is substantially stationary with a mean static equilibrium between the upstream excess pressure and the downstream lowered pressure, a controlled striction permitting the preceding intermediate stage III to be only moderately affected by the upstream displacement of the pressure drop in the feed line.

Again for release from inertial problems appertaining to the diaphragms of the pressure reducers $A_1 \ldots A_i$, these latter will also advantageously be disposed on the faces of a regular polyhedron analogous to that of the pressure reducers of the final stage V. They could be each coupled in opposition with the corresponding pressure reducers $B_i$ of the final stage V so as thereby to pair off in opposition the two pressure reducers in series of the stages IV and V. In the case where each stage comprises six pressure reducers, each pair is placed at the centre of the faces of a cube, as shown in FIG. 2. For more severe conditions of use of the motor or for motors of large capacity, there would be used for each stage IV or V six or twelve pressure reducers, the various pressure reducers being distributed in a centred dodecahedral spatial configuration, with two pressure reducers of a same stage always on the two opposed faces of the polyhedron. It would be likewise possible to position the pressure reducers of the two final stages on the faces of a rhomboid dodecahedron or of a rhomboid tricontrahedron. It would likewise be possible to use only two pressure reducers, disposed back to back or face to face or three pressure reducers disposed according to a cylindrical configuration, these solutions being however clearly inferior to the former.

To take into account, on the one hand, of transitory phenomena occurring, downstream as far as stage III, and on the other hand of variations of pressure of the gas in the tank 100 and notably in the case of butane as a function of temperature, there is advantageously provided, between the first principal stage I of pressure reduction and the first intermediate stage III, a second intermediate stage II the diaphragm of which can be loaded in adjustable manner by a calibratable spring as shown at 60. Typically, as mentioned above, the inlet conduit $\alpha$ has a cross-section at least double the normal cross-section for a pressure reducer I serving to carry out the necessary pressure reduction, the intermediate conduits $\beta$ and $\gamma$ between the stages I–II and II–III, as well as the inlet fittings of these stages II and III, being similarly dimensioned. In the complete installation shown in FIG. 1, the adjustments of the various stages can be analysed as follows: stage I carries out a pressure reduction and a pre-adjustment of the richness of the mixture as a function of the general characteristics of the motor substantially corresponding to the adjustment of the richness for the speed of travel on a motorway, a large range of variation about the adjusted value being permitted by the following stages of the inlet line. The adjustment of the second intermediate stage II corresponds, in fact, to the adjustment of the normal richness of the air/gas mixture for travelling on the road, the lowering of pressure of the motor, at this rate, reaching the final intermediate stage III. The adjustment of this first intermediate stage III corresponds to the adjustment of the richness for slowing down or starting up of the motor because, under these conditions, the low pressure drop in the conduit T only passes up, with stroking, as far as the final pre-stage IV, the function of the final stages IV and V being to smooth out the fluctuations of the pressure drop at slowing down and accelerating and to delay the rising or lowering wave fronts whilst making the feed pressure of the gas subject to the ambiant atmospheric conditions.

Figure 3:
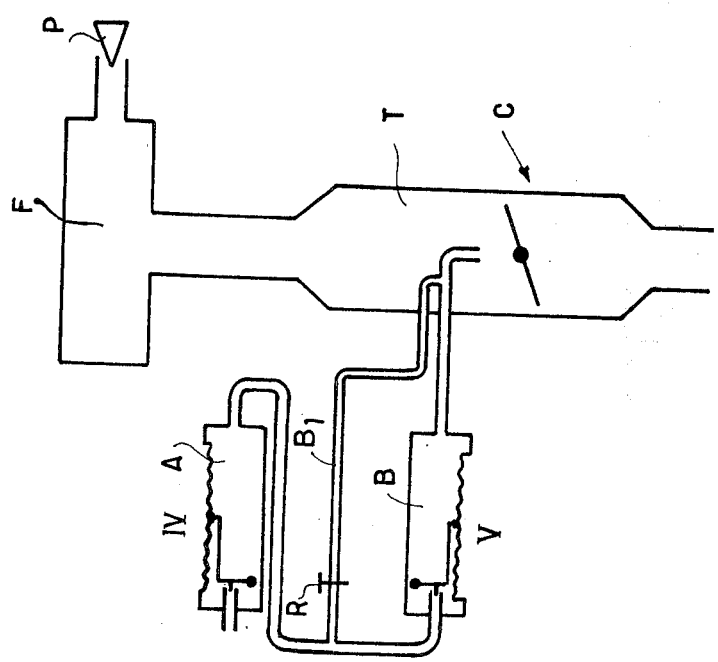
FIG. 3 shows schematically the two output stages of a gas feed apparatus according to a first modification.

There is shown, in FIG. 3, the final pre-stage IV and the final stage V of a feed apparatus conforming to FIG. 1 so far as concerns stages I to III.

Each of the stages IV and V comprises a single pressure reducer A and B respectively, of the type with non-loaded diaphragm and disposed horizontally, one opposite to the other with a low position for the pressure reducer B and a high position for the pressure reducer A which is situated above B.

A nozzle $B_1$, provided with a cock R, is coupled to the connection conduit between the outlet of A and the inlet of B and opens, like the outlet of B, into the air inlet conduit T of the motor, just in front of the butterfly valve of the carburettor C, downstream of the air filter F, the inlet of which is adjusted by a needle P.

The cross-section of the nozzle $B_1$ is advantageously substantially equal to or slightly less than the cross-section of the inlet of B.

The respective diaphragms of A and of B being substantially horizontal, they are only very little subject, from the point of view of inertia, to the environmental conditions, especially acceleration, turning or braking of the vehicle.

The weight of the diaphragms themselves tends to close the pressure reducer B and to open A which, in short, facilitates the operation in opposition of the diaphragms as a function of variations of the lowering of pressure in the conduit T.

It would be possible to eliminate the nozzle $B_1$, but it would then be necessary to further close off the air at the entry, which is an inconvenience. The nozzle facilitates the passing of the pressure lowering towards stage IV. This effect is accentuated when there is provided, for stage IV, an auxiliary pressure reducer $A_1$, mounted in parallel with the first A (FIG. 4) and having its diaphragm in low position. In this modification, the inlet of the nozzle is coupled to the outlet of the pressure reducer $A_1$.

The cock R permits the closing of the nozzle, which facilitates manual starting when hot.

According to a modification, the assembly constituted by the nozzle $B_1$ and the cock R could be replaced by a movable pressure reducer coupled up in the same manner as the said assembly in FIG. 3 or in FIG. 4. This supplementary pressure reducer would be arranged to be able to undergo a rotation of 180°, that is to say to be able to pass from a first position in which its diaphragm would be in low position, to a second position in which its diaphragm would be in high position, the said diaphragm being, in the two positions, parallel to those of the other pressure reducers.

The first position would be adopted for manual starting when hot and the second for manual starting when cold.

By way of modification, there could be provided for each of the stages IV and V a plurality of pressure reducers arranged in space in accordance with the faces of a regular demi-polyhedron, that is to say comprising half of the pressure reducers provided in the preferred manner of construction described with reference to FIG. 1.

The diaphragms of the pressure reducers of the respective stages would however be disposed one with respect to the other as shown in FIG. 3, that is to say "low" for stage V and "high" for stage IV and one opposite to the other in pairs. The "horizontal plane" defined above would then be that which divides the complete polyhedron in two and defines the median position of the whole of the pressure reducers of a same stage.

Figure 5:
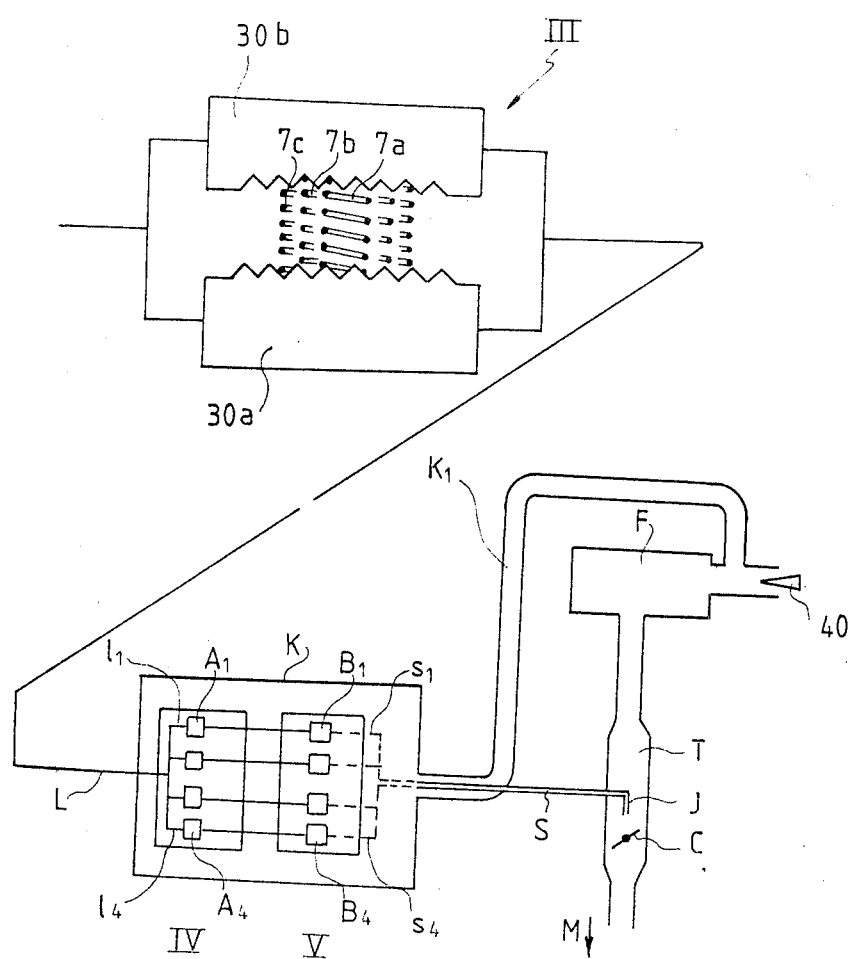
FIG. 5 shows schematically the last intermediate stage, the two output stages and the intake conduit of a feed apparatus in accordance with another form of construction.

In FIG. 5, it has been supposed, by way of example, that the two stages IV and V conform to one of the arrangements described with reference to FIG. 1, that is to say that they each comprise four pressure reducers ($A_1$ to $A_4$, $B_1$ to $B_4$ respectively) arranged in space according to the four lateral faces of a cube. This arrangement is not limiting in any way and one could use any of the arrangements which appear from the description.

There have not been shown the two or three stages which precede the last intermediate stage III, which is coupled to the final pre-stage IV by a line L which will be as short as possible. The outlet nozzles $S_1$-$S_4$ of the pressure reducers of the final stage V are coupled to an outlet line S which opens at J into the air intake conduit T of the motor M, just before the butterfly valve of the carburettor C, downstream of the air filter F the inlet of which can be modified, to control the mass throughput of air, by a needle 40. The air which arrives at 40 is under pressure, both in the case when the conduit T has been connected to a blower as well as in the case where a turbo-compressor has been used.

In the apparatus described, the stages IV and V are housed in a common casing K coupled by a conduit $K_1$ to the inlet of the intake conduit, or again to exhaust. To adjust the excess pressure at the interior of the casing K, it could be provided with an outlet opening of small adjustable cross-section.

As a result, the diaphragms of the pressure reducers are subjected permanently to the same pressure as that which is present at the inlet of the intake conduit. When this pressure is greater than atmospheric pressure, the force which it exerts on the diaphragms tends to favour the opening of the pressure reducers, that is to say it acts in the same direction as the reduction of pressure which occurs when starting up or slowing down.

It can be advantageous, although not shown in the drawing, to separate the two parts of the casing K which respectively contain the stages IV and V by a partition and to cause the excess pressure to arrive in the two compartments thus formed through two separate conduits. This solution permits to provide separate adjustments of the excess pressures which are present at the diaphragms of the pressure reducers of the two respective stages.

It will be noted that, if the adjustments of the apparatus are such that, whilst starting up and slowing down, the lowering of pressure in the inlet conduit reaches as far as stage III, this latter will preferably likewise be housed in the casing in order that the diaphragms of its pressure reducers shall themselves be subjected to the excess pressure.

There is shown, in FIG. 5, a last intermediate stage III comprising advantageously two pressure reducers 30b and 30a arranged as indicated in FIG. 1.

According to a feature of FIG. 5, three adjustable concentric springs 7a - 7b - 7c have been provided between the diaphragms of the pressure reducers 30b and 30a, the spring 7c being adjusted in order that, when at its maximum unloading, the excess pressure which exists in stages III achieves a first value, for example of the order of 30 millibars; the spring 7b is adjusted so that, when at its maximum unloading, the said excess pressure achieves a second value substantially lower than 30 millibars, and the spring 7c is adjusted so that, when at its maximum unloading, the said excess pressure achieves a third value substantially lower than the second. By reason of this arrangement with multiple springs having action in stages, it is possible to obtain, with the aid of a single stage III, adjustments corresponding to slow running and to stages of operation on the road and on the motorway and consequently to envisage in certain cases the elimination of stages I and II.

It is to be understood that it would be possible to provide at a different stage ranges of working of these springs or to obtain a staged operation with any system of springs having an appropriate characteristic of adjustable staged lowering of pressure.

I claim:

1. In combination with an internal combustion motor having an intake manifold and a feed source of air at an excess pressure, a device for providing a gaseous fuel to the said motor, said device comprising a plurality of interconnected stages of pressure reduction interposed between a reservoir of fuel and the motor, these stages including at least one inlet stage coupled to the reservoir and comprising a pressure reducer loaded by spring means and providing a substantially constant pressure slightly greater than atmospheric and a final stage having an outlet coupled to the said intake manifold, wherein at least the said final stage comprises at least one pressure reducer having a non-loaded diaphragm and is arranged to provide substantially no pressure reduction and to operate on substantially nil excess pressure and, at starting up and slowing down, in transitory alternating working conditions with oscillatory motion of the diaphragm as a function of the lowering of pressure in the said intake manifold, the fluctuations of which are thereby smoothed.

2. A combination as claimed in claim 1, wherein the final stage comprises at least two pressure reducers arranged in such a manner as to reduce, from the point of view of inertia, the joint effect of weight and centrifugal force.

3. A combination as claimed in claim 1, wherein the final stage comprises at least four pressure reducers having non-loaded diaphragms, orientated in space according to the faces of a regular polyhedron.

4. A combination as claimed in claim 3, said device comprising a pre-final stage comprising the same number of pressure reducers having a diaphragm as the final stage, each in series with a pressure reducer of the final stage, and orientated according to the faces of a same regular polyhedron.

5. A combination, as claimed in claim 4, wherein each pressure reducer of the pre-final stage is coupled in opposition to a pressure reducer of the final stage.

6. A device as claimed in claim 1, wherein the final stage comprises a pressure reducer having a non-loaded diaphragm and orientated substantially in a horizontal plane, disposed in such a manner that the diaphragm is in a lower position with respect to the bottom of the case, whilst the pre-final stage comprises a pressure reducer (A) with preferably non-loaded diaphragm, the said diaphragm being substantially disposed in a plane parallel to that of the diaphragm of the pressure reducer of the final stage and facing the latter and the pressure reducer (A) of the pre-final stage being located above that one (B) of the final stage, in such a manner that its diaphragm is in a higher position with respect to the bottom of the case.

7. Device as claimed in claim 6, characterised by an auxiliary nozzle (B1) opening into the air admission circuit of the motor, in the region of the outlet conduit of the pressure reducer (B) of the final stage, and which is connected on the connection conduit between the outlet of the pressure reducer of the pre-final stage and the inlet of the pressure reducer of the final stage.

8. Device as claimed in claim 6, characterised in that the pre-final stage comprises a supplementary pressure reducer (A1) mounted in parallel with the first one (A), having its diaphragm in low position and to the outlet of which there is connected an auxiliary nozzle (B1) opening into the air admission circuit of the motor, in the vicinity of the outlet conduit of the pressure reducer (B) of the final stage.

9. Device as claimed in claim 6, characterised by a supplementary pressure reducer connected to the air admission circuit of the motor, in the vicinity of the outlet conduit of the pressure reducer (B) of the final stage and which is coupled to the conduit connecting the outlet of the pressure reducer of the final stage, the said supplementary pressure reducer being arranged to be able to undergo a rotation of 180°, causing it to pass from a first position in which its diaphragm is in low position to a second position in which its diaphragm is in high position.

10. Device as claimed in claim 6, characterised in that the pre-final stage comprises a supplementary pressure reducer (A1), in parallel with the first, having its diaphragm in low position and at the outlet of which is connected another pressure reducer itself to a conduit opening into the air admission circuit of the motor, in the vicinity of the outlet conduit of the pressure reducer (3) of the final stage, said other pressure reducer being arranged to be able to undergo a rotation of 180°, causing it to pass from a first position in which its diaphragm is in low position to a second position in which its diaphragm is in high position.

11. A combination as claimed in claim 4, wherein at least the said pre-final and final stages are housed in a substantially closed casing (K) which is connected to the said feed source of air at an excess pressure.

12. A combination as claimed in claim 11, wherein the said device comprises a last intermediate stage which precedes the pre-final stage in the said plurality of interconnected stages, said last intermediate stage comprising first and second pressure reducers respectively having first and second diaphragms and arranged in opposition and a plurality of concentric springs interconnecting the said first and second diaphragms, the respective springs being adapted for effecting their maximum unloading or maximum loading for staged excess pressures.

* * * * *